(12) United States Patent
Myrfield, Jr.

(10) Patent No.: US 11,065,699 B2
(45) Date of Patent: Jul. 20, 2021

(54) METHOD AND APPARATUS FOR CUTTING TRUE WITH A ROUND SAW

(71) Applicant: Warren Myrfield, Jr., Olympia, WA (US)

(72) Inventor: Warren Myrfield, Jr., Olympia, WA (US)

(73) Assignee: Saw Add LLC, Olympia, WA (US)

( * ) Notice: Subject to any disclaimer, the term of this patent is extended or adjusted under 35 U.S.C. 154(b) by 205 days.

(21) Appl. No.: 16/326,194

(22) PCT Filed: Aug. 17, 2017

(86) PCT No.: PCT/US2017/047453
§ 371 (c)(1),
(2) Date: Mar. 19, 2019

(87) PCT Pub. No.: WO2018/035384
PCT Pub. Date: Feb. 22, 2018

(65) Prior Publication Data
US 2019/0308261 A1    Oct. 10, 2019

Related U.S. Application Data

(63) Continuation of application No. 15/680,135, filed on Aug. 17, 2017, now abandoned.

(60) Provisional application No. 62/376,762, filed on Aug. 18, 2016, provisional application No. 62/376,762, filed on Aug. 18, 2016.

(51) Int. Cl.
| | |
|---|---|
| *B23D 59/00* | (2006.01) |
| *B23Q 15/013* | (2006.01) |
| *B27B 7/04* | (2006.01) |
| *B27B 25/00* | (2006.01) |

(52) U.S. Cl.
CPC ......... *B23D 59/001* (2013.01); *B23Q 15/013* (2013.01); *B27B 7/04* (2013.01); *B27B 25/00* (2013.01); *G05B 2219/37355* (2013.01); *G05B 2219/45144* (2013.01)

(58) Field of Classification Search
CPC ............................ B23D 59/002; B23D 59/001
See application file for complete search history.

(56) References Cited

U.S. PATENT DOCUMENTS

| | | | | |
|---|---|---|---|---|
| 5,115,403 | A * | 5/1992 | Yoneda | B23D 59/001 |
| | | | | 700/173 |
| 2003/0097917 | A1 * | 5/2003 | Virvalo | B27B 17/0058 |
| | | | | 83/74 |
| 2003/0102053 | A1 * | 6/2003 | Kennedy | B27B 1/007 |
| | | | | 144/357 |

* cited by examiner

*Primary Examiner* — Jennifer B Swinney
(74) *Attorney, Agent, or Firm* — Mersenne Law

(57) ABSTRACT

Process accuracy and throughput in a system for processing timber and lumber with a circular gang saw can be improved by measuring a sawing force and a guide friction force near an end of one or more saw arbors and incorporating the force measurement into a process control system to adjust the workpiece feed speed (or other process parameters) to achieve better results.

15 Claims, 9 Drawing Sheets

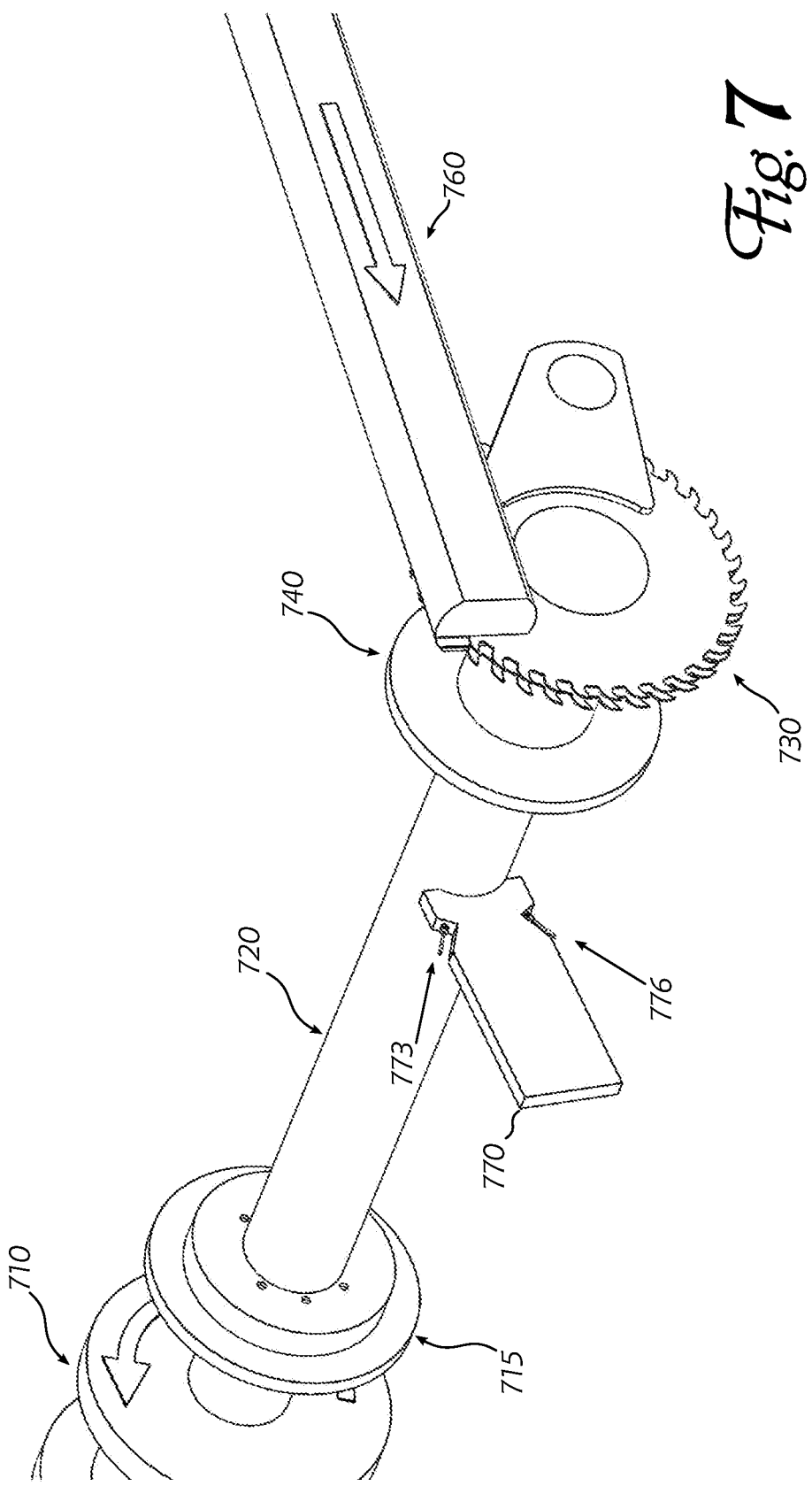

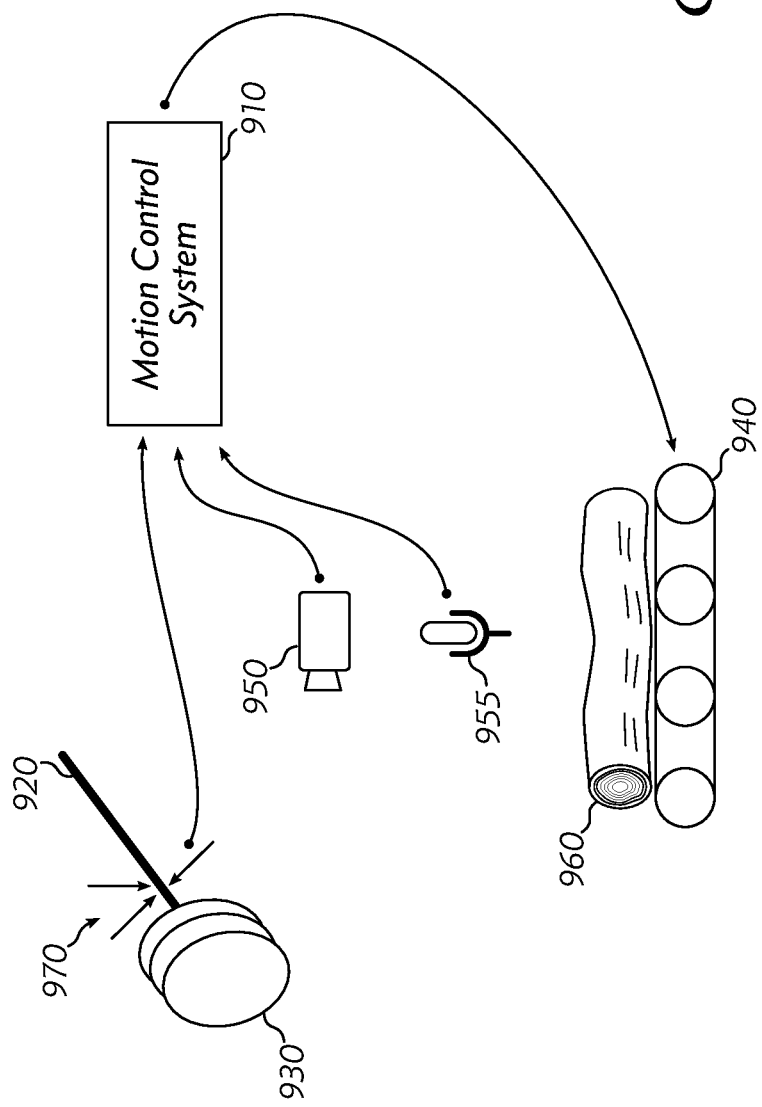

METHOD AND APPARATUS FOR CUTTING TRUE WITH A ROUND SAW

CONTINUITY AND CLAIM OF PRIORITY

This is a United States patent application filed under 35 USC § 371, which claims priority to PCT patent application no. PCT/US2017/047453 filed 17 Aug. 2017, which claimed priority to U.S. provisional patent application No. 62/376,762 filed 18 Aug. 2016; and U.S. utility patent application Ser. No. 15/680,135 filed 17 Aug. 2017, now abandoned.

FIELD

Systems and methods for driving an anti-deviation process control loop in a circular saw, more particularly in which process control is driven by an output of a force or deformation sensor mounted on a deformable structure to measure deformation of the structure caused by a force between a saw blade and a workpiece and/or between a saw blade and a saw guide.

BACKGROUND

Timber processing (i.e., manufacture of standard dimensional lumber from raw logs) is a capital- and labor-intensive undertaking with thin margins and keen competition. Large bandsaws are often used for initial shaping, but some mills use circular saws instead. Circular saws (and ganged circular saws) are also common in subsequent processing steps to divide large, squared-off cants into boards.

It is always important for mill operations to be safe, accurate, fast and reliable. Automatic process control is a common element in achieving these goals. Measurements are taken from many system components and are combined through a programmable logic controller or similar process controller to produce control signals for results-effective variables. Some such variables are saw speed, saw power and workpiece feed speed. By carefully adjusting these variables based on feedback from process measurements, a mill can achieve improved throughput without sacrificing accuracy and consistency.

Existing systems are known to accept process data from sensors such as video cameras (i.e., computer-vision systems) and audio sensors (microphones), as well as direct measurements of blade rotational speed and drive system power. Systems and apparatus to acquire additional types of information about the sawing process may be of significant value in this field.

SUMMARY

Embodiments of the invention instrument circular gang saws (e.g., timber-processing saws having a plurality of round blades on each of one or more arbors) to obtain force or displacement measurements that correlate to forces and displacements experienced by the saw blades. The measurements, made remotely from the blades, can be used by a workpiece transport system to optimize sawing operations (increase feed speed and therefore throughput, but with the ability to slow down when needed so that sawing accuracy or consistency is conserved or improved).

BRIEF DESCRIPTION OF DRAWINGS

FIG. 7 shows a cantilevered circular saw and possible locations for sensors according to an embodiment.

FIG. 9 shows a general functional-block diagram of a system comprising sensors according to an embodiment.

DETAILED DESCRIPTION

Embodiments of the invention measure a round-saw or circular-saw process condition at or near an end of an arbor carrying at least two circular saw blades. Since the measurement location is distant from the active area of the saw, the sensor(s) are protected from this challenging environment. However, the nature of the measurement is such that conditions at the saw blades can be inferred. Thus, the measurement can be used by a workpiece drive system to optimize feed speed so that the saw is neither underfed (which reduces throughput and may damage saw teeth) nor overfed (which may overload the motor, damage the saw blades, or cause blade deviation that results in inconsistent board dimensions or surface quality).

Figure 1:
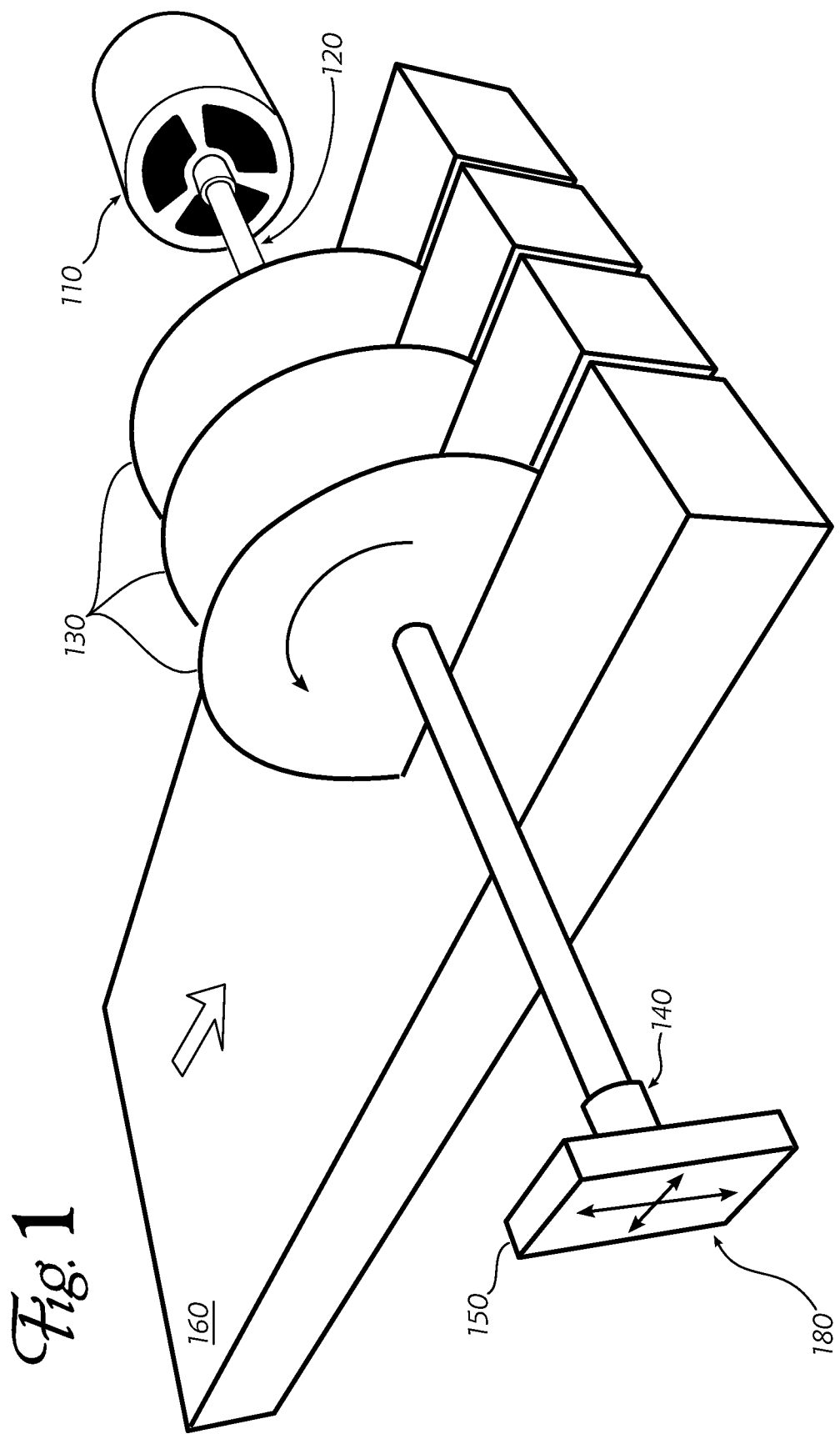
FIG. 1 shows a simplified single-arbor, multiple-blade circular saw (a "gang saw").

FIG. 1 shows a representative model of a system where an embodiment of the invention operates. A motor 110 drives a shaft or arbor 120 (which is typically splined), upon which a plurality of circular saw blades 130 are mounted. (Spacers called "saw guides," not visible in this view, separate the blades by predetermined distances so that the saw makes the desired cuts.)

The opposite end of arbor 120 is carried by an idler bearing 140, which is mounted to a side plate 150 of the machine structure. (A saw often has an enclosure surrounding the arbor and blades, and a door at 150 allows saw blades 130 to be removed from the arbor, sharpened and reconfigured.)

A workpiece 160 is driven through the saws at a predetermined rate by a motion control system (not shown). The feed rate is an important process control variable: an excessively slow feed rate reduces throughput and may cause unexpectedly high saw wear. Excessively high feed speeds cause uneven sawing (deviation) and other sorts of equipment damage. Unfortunately, the harsh environment near the blade prevents the small, precise measurements that might help tune the process, and even if sensors could be deployed near the blade, they would interfere with the removal, reconfiguration and replacement of the saws.

An embodiment of the invention measures forces near the end of the arbor, for example at the non-driven end 180, using structures and methods described below. This approach provides sufficient information to control the feed speed and other sawing process parameters, while significantly improving the robustness and maintainability of the system.

In a prior-art saw, the arbor bearing or journal opposite the driven end is securely fixed to the frame of the machine, so that the arbor and saw blades run in their desired courses (except for the minimal flexion in the frame, bending or twisting of the arbor, and wobbling of the saw blades). As long as the control system selects suitable saw and workpiece feed speeds, deviations are small and the sawing process will be well-controlled. However, the control system can do a better job if provided with real-time process measurements that reflect instantaneous variations (for example, lumber density may vary significantly from workpiece to workpiece, or even along a single cant).

Embodiments of the invention may use one or more force sensors coupled to or monitoring forces at an end of the arbor (or arbors) to measure the forces that result from a workpiece being driven through the saw. These forces correlate well with blade and arbor deflections that cause variations in sawn lumber width and thickness. In connection with the saw power (which can be obtained from the motor or another part of the drive system), the arbor-end forces serve as inputs to the control algorithm. When the arbor-end forces are below a minimum value, the saw is either between workpieces, or the workpiece is being fed too slowly. When the arbor-end forces exceed a maximum value, the workpiece is being fed too fast (for the current saw speed, blade condition and workpiece density). The control algorithm accepts sensor data that is available and adjusts process-control parameters to achieve superior results (e.g., higher throughput, more accurate and/or less-variable cuts, etc.) An embodiment of the invention produces new and useful process measurement data so that the control algorithm can produce improved results.

Figure 2:
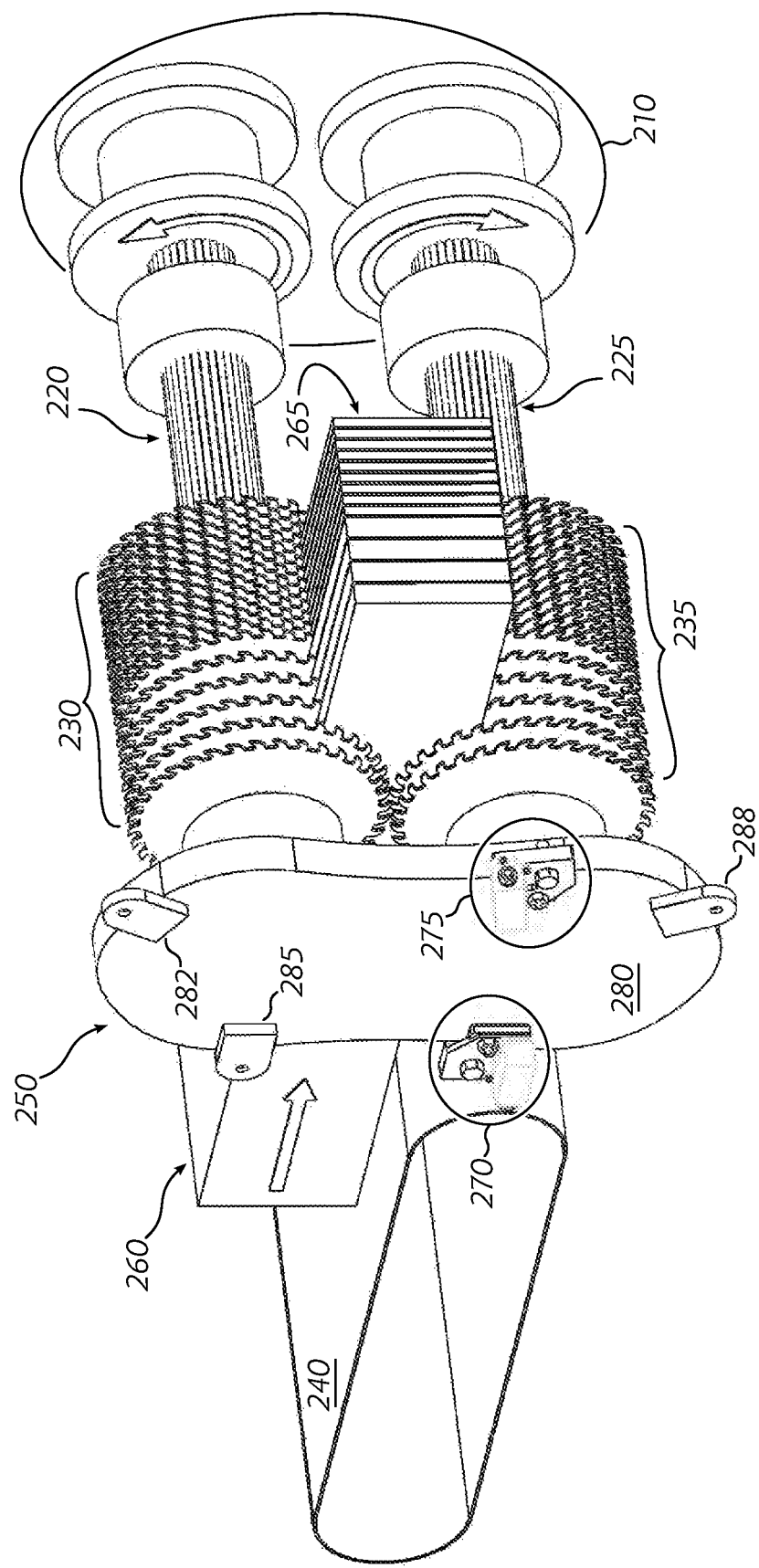
FIG. 2 shows a double-arbor, multiple-blade circular saw (gang saw) including an embodiment of the invention.

FIG. 2 shows another embodiment of the invention installed on a double-arbor circular gang saw. As described with reference to FIG. 1, splined arbors 220, 225 carry a plurality of saw blades 230, 235. The blades are spaced apart so that a workpiece 260 driven through the saw by a drive system 240 is sawn into a plurality of boards of predetermined thickness (at 265).

The arbors 220, 225 are driven from one end 210, and are supported at the other, non-driven end 250 by bearings, bushings, idlers or similar conventional structures, supported (in this embodiment) on a side plate 280 which acts as a door to change saws. This plate may be secured to the frame of the saw by mounting tabs 282, 285, 288, although other conventional mounting arrangements are also possible.

In an embodiment, sensors 270, 275 located near the undriven ends of the arbors 220, 225 are placed so that they can measure motion, deflection and/or deformation during sawing (with a return to zero between workpieces). Preferably, the sensors are positioned outside the active sawing area, but in close mechanical connection to the arbor ends so that arbor forces are communicated to the sensors.

In this embodiment, sensors are configured as fixtures 270 and 275 that can detect flexing and twisting of the side plate, caused by the sawing forces as a workpiece travels through the gang saw. The forces are transmitted from the blades to the side plate via the arbors and their connection to the idler bearings.

Figure 3:
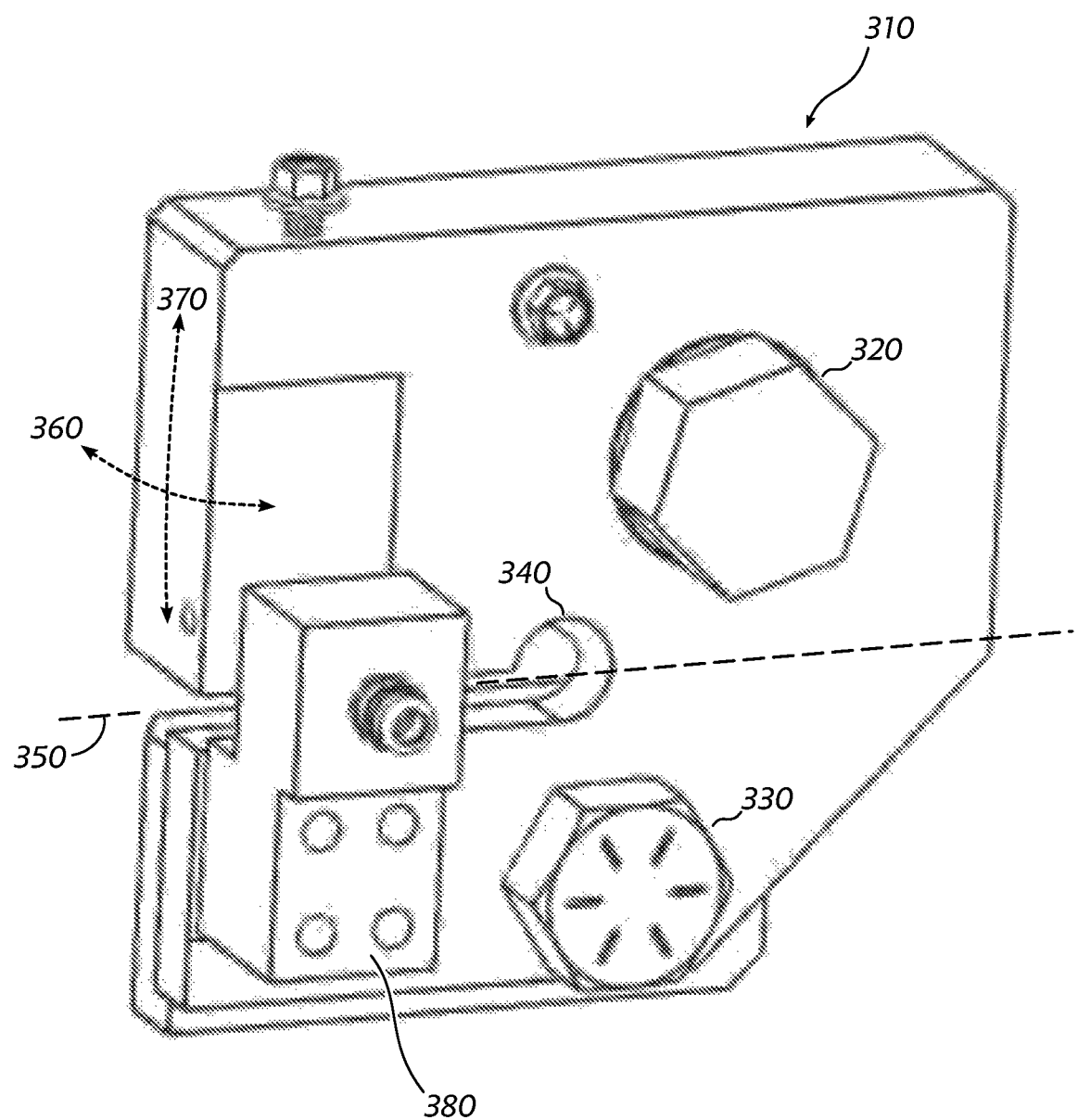
FIG. 3 shows a force sensor suitable for use in an embodiment.

FIG. 3 shows a sensor that may be suitable for use in an embodiment. For example, this sensor may be used in the locations indicated as 270 and 275 in FIG. 2. A sensor may comprise a stout plate 310 which is sized and shaped to substitute for a mounting tab that holds the arbor idler bearing(s) in place. The plate may be secured to the frame of the saw by a first fastener 320, and to an idler bearing carrier by a second fastener 330. The plate may be partially transected by a slot having a keyhole profile as shown at 340. This slot weakens the plate in a well-characterized way so that it can twist (360) or flex (370) along dashed line 350. The material, configuration, and any weakening slot or slots of the sensor are chosen so that stresses encountered during saw operation cause repeatable, predictable, elastic strains in the plate. These strains are measured by a sensor 380 and reported as an electrical signal to the control logic. Sensor 380 is preferably a non-contact sensor such as an eddy-current sensor, a capacitive sensor, a laser reflectometer, laser interferometer or accelerometer. Sensors that undergo physical deformation along with the strain in the plate, such as strain gauges, may also be used.

A weakened plate as shown here is similar in concept to a spring with an extremely high spring constant, which flexes through a very small range. Measuring this flexion gives a signal that is proportional to the force applied to the measured structure. The orientation and range of the "spring" are controlled by the shape and configuration of the plate. In an embodiment, installation locations for the sensors are chosen so that the sensors are affected by forces transmitted to the measurement areas by the arbors. Sensors are preferably located outside the active sawing area so that the conditions they must endure are less extreme. For many saw configurations, sensors may be placed at either end of the arbor that carries the saw blades. Arbors typically terminate at an idler bearing carried on a side plate whose forces can be measured, or pass through an opposing side plate to connect to the saw drive system; forces may be measured at either end, or at both ends. A sensor for a particular saw configuration may be a fixture coupled to the saw near an arbor end so that forces in the arbor (in particular, the radial sawing forces and radial deviation friction forces) are communicated through the fixture to the sensor, so that the sensor measurement is proportional to the force.

Figure 4:
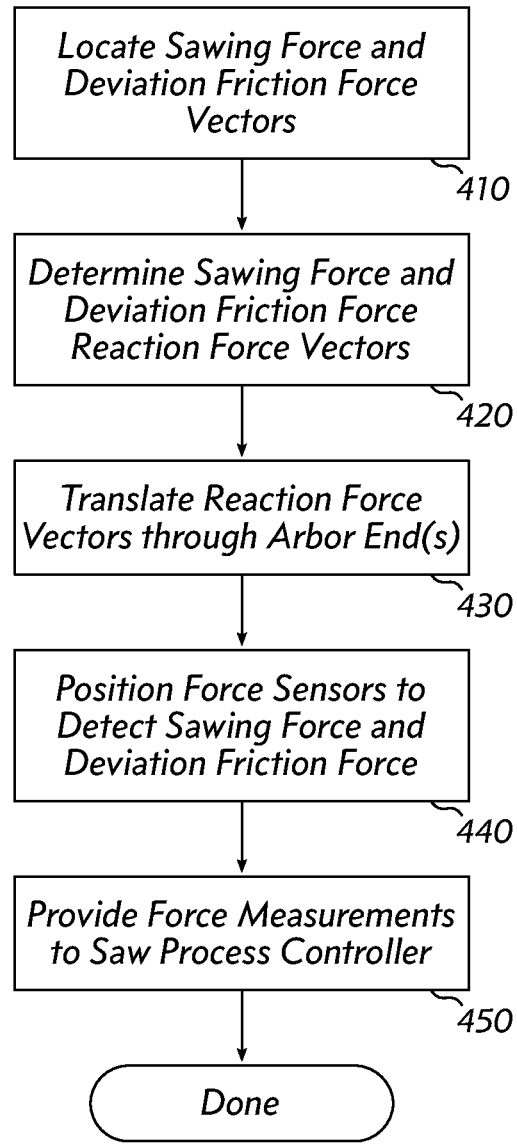
FIG. 4 outlines a method for configuring a multiple-blade circular saw to incorporate and benefit from an embodiment of the invention.
Figure 5A:
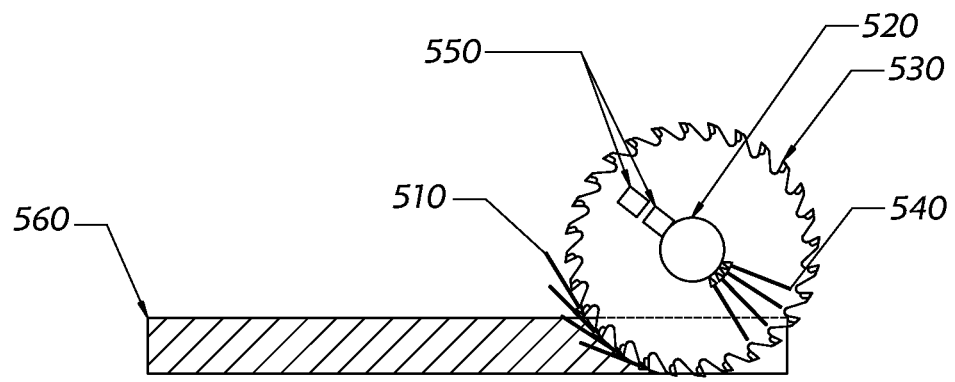
FIGS. 5A and 5B show two principal forces of concern to embodiments of the invention.
Figure 5B:
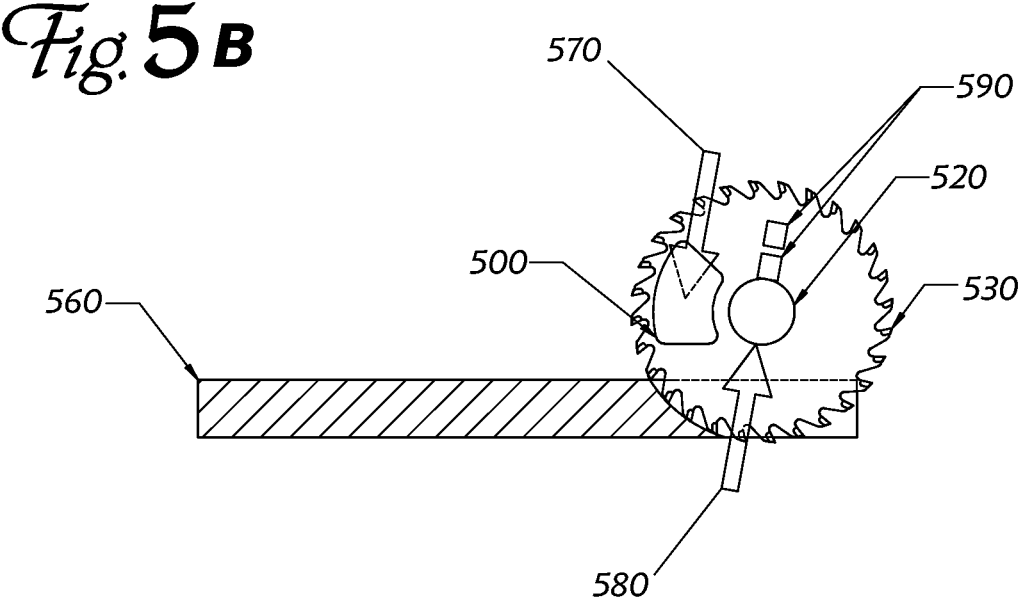

Since there are a variety of saw configurations where an embodiment of the invention can provide improved performance, FIG. 4 outlines a method for tailoring an embodiment to suit a particular type of saw. First, the sawing force and deviation friction force vectors at the blades are located (410). Turning briefly to FIGS. 5A and 5B, these figures show a simplified side view of a circular saw (blade 530 driven counterclockwise by arbor 520, cutting workpiece 560). In FIG. 5A, a series of sawing force vectors are shown at 510; each vector corresponds to the force on a tooth traveling in an arc through the workpiece. These are radial forces, roughly tangent to the saw blade at the tooth. In FIG. 5B, vector 570 indicates the deviation friction force vector, which is the force felt by the blade due to friction against the saw guide 500. This is also a radial force, centered between the arbor and the tooth, but parallel to a tangent line at the outside edge of the blade. The first step of the method of FIG. 4 locates these forces and determines their direction. Note that the force vectors point about 60° apart (the multiple sawing force vectors depend on the blade tooth spacing and workpiece thickness). Because of this difference, it is important for an embodiment to sense forces in two different directions.

Next, the sawing and deviation friction reaction force vectors are determined (420). In FIGS. 5A and 5B, these are indicated at 540 and 580, respectively. Now, the reaction force vectors are translated through to the arbor ends (430). This results in the identification of favorable places to measure the forces. In FIGS. 5A and 5B, the translated forces are indicated at 550 and 590, respectively; the two boxes show points between which force measurements are desired.

To adapt the saw under consideration to use an embodiment of the invention, force sensors (such as the one described with reference to FIG. 3) are positioned near the identified places (440). It is appreciated that the structure of a machine may interfere with optimal sensor positioning, but one of ordinary skill can locate a suitable alternative near the optimal position once she has considered the principles and goals of an embodiment as described herein. Since there are two different forces of interest, which act in different directions, an embodiment should measure forces in different directions as well. Ideally, the sensing directions are chosen to line up with the reaction-force vectors, but when this is not possible, other directions may be sensed. In the latter case, each sensor will report a measurement that is affected by a combination of the forces, but the two non-collinear sensors between them will detect the forces necessary to improve sawing operations according to an embodiment.

Finally, the measurements from the sensors are provided to a saw process controller (450) for use in determining suitable feed and saw speeds for processing workpieces. As discussed earlier, force measurements and process control feedback may vary dynamically along a workpiece, as well as between workpieces, so sensors of an embodiment preferably report force measurements frequently (e.g., hundreds of times per second), or even continuously. With high-frequency or continuous measurements, the control loop can respond quickly to prevent both overfeeding and underfeeding. This results in high throughput with low deviation, giving improved yields.

Figure 6A:
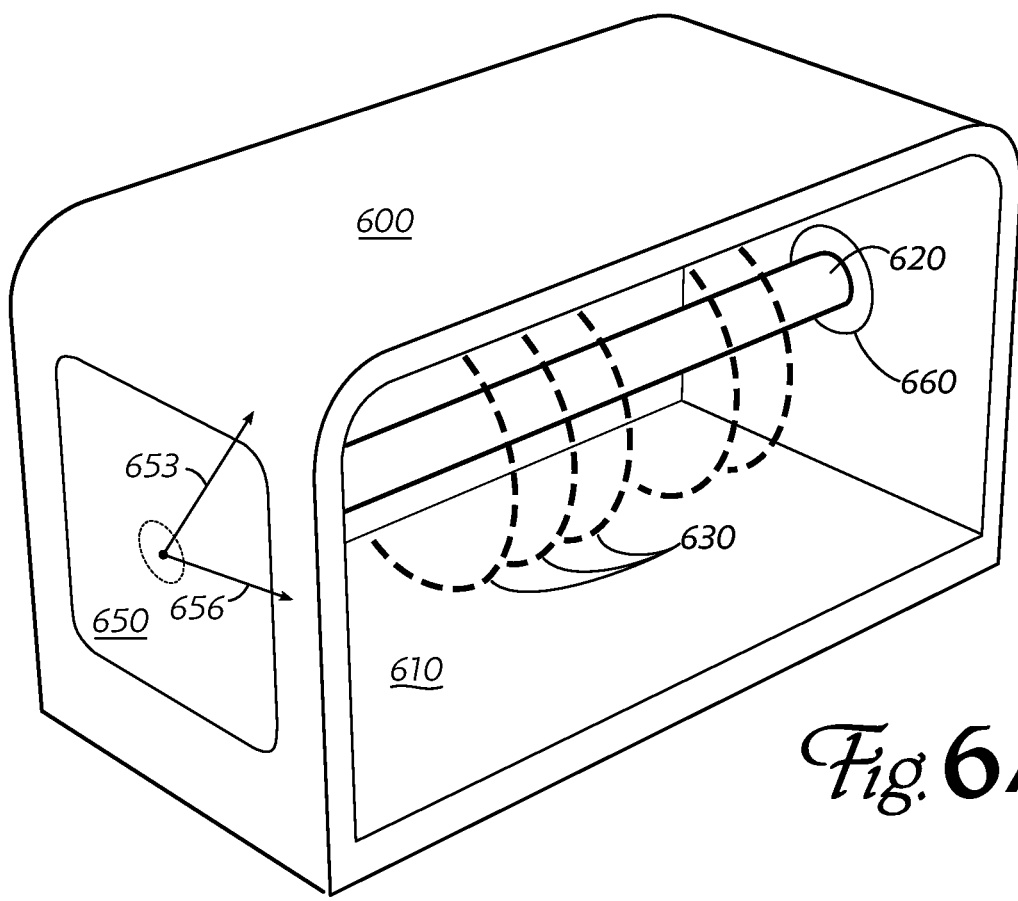
FIGS. 6A and 6B show a single-arbor, multiple-blade gang saw from two perspectives to illustrate possible force-measurement locations.
Figure 6B:
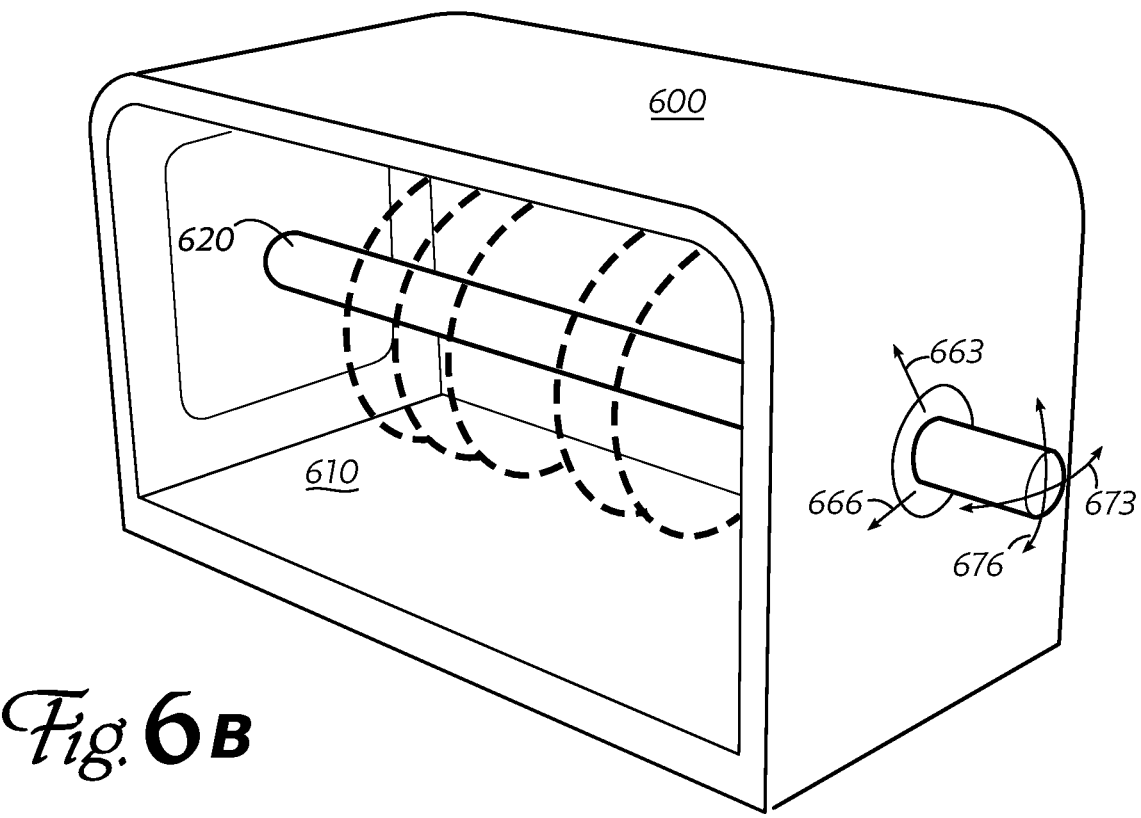

FIGS. 6A and 6B show two perspectives of a single-arbor circular gang saw similar to that pictured in FIG. 1. A frame 600 surrounds the sawing area 610, which contains arbor 620 and a plurality of saw blades 630 (represented by heavy dashed lines). An embodiment may measure forces that correlate to those experienced by arbor 620 and blades 630 by monitoring the forces that the arbor communicates to access door 650 near the non-driven end of arbor 620 (example measurement positions and directions shown at 653 and 656). Alternatively, forces may be measured near the driven end of arbor 620, for example at bearing 660 (example measurement positions and directions shown in FIG. 6B at 663 and 666). Finally, measurements of arbor flexing and bending may be obtained directly from a portion of the arbor outside the sawing area 610, as shown by arrows 673 and 676 in FIG. 6B. Measurements from two or more locations, in two or more directions, can be combined freely, so long as there is at least some angular span between the multiple measurement directions so that the different forces of interest—sawing force and deviation friction force—can be distinguished.

FIG. 7 shows a different circular-saw arrangement where an embodiment of the invention may be used. This is a cantilevered splined arbor saw: instead of containing blades running between a driven end and an undriven end (FIGS. 1 & 2), there is a shaft 720 (no splines are necessary over this portion; the name "jackshaft" may be more appropriate for this element) driven by a motor via pulley 710 and running between a driven-end bearing 715 and an undriven-end bearing 740. The jackshaft or arbor 720 extends beyond the undriven end bearing 740 and carries at least one saw blade 730. A workpiece 760 is driven against the blade 730 by a workpiece drive system (not shown) that generally comprises driven side rolls on the flat sides created by chipping heads and a driven chain under the log that is narrow enough to go between the cantilevered arbors.

For a saw like this, an embodiment of the invention comprises a plurality of sensors on a carrier 770, which measure displacement of arbor/jackshaft 720 in at least two directions 773, 776. These sensors report the amount of bending or flexing caused by unbalanced radial forces experienced by the arbor as the saw cuts a workpiece. The sensors are rotationally displaced from one another so that they measure bending or flexing in different planes. The measurements are communicated to the workpiece drive controller to optimize the feed speed.

Figure 8:
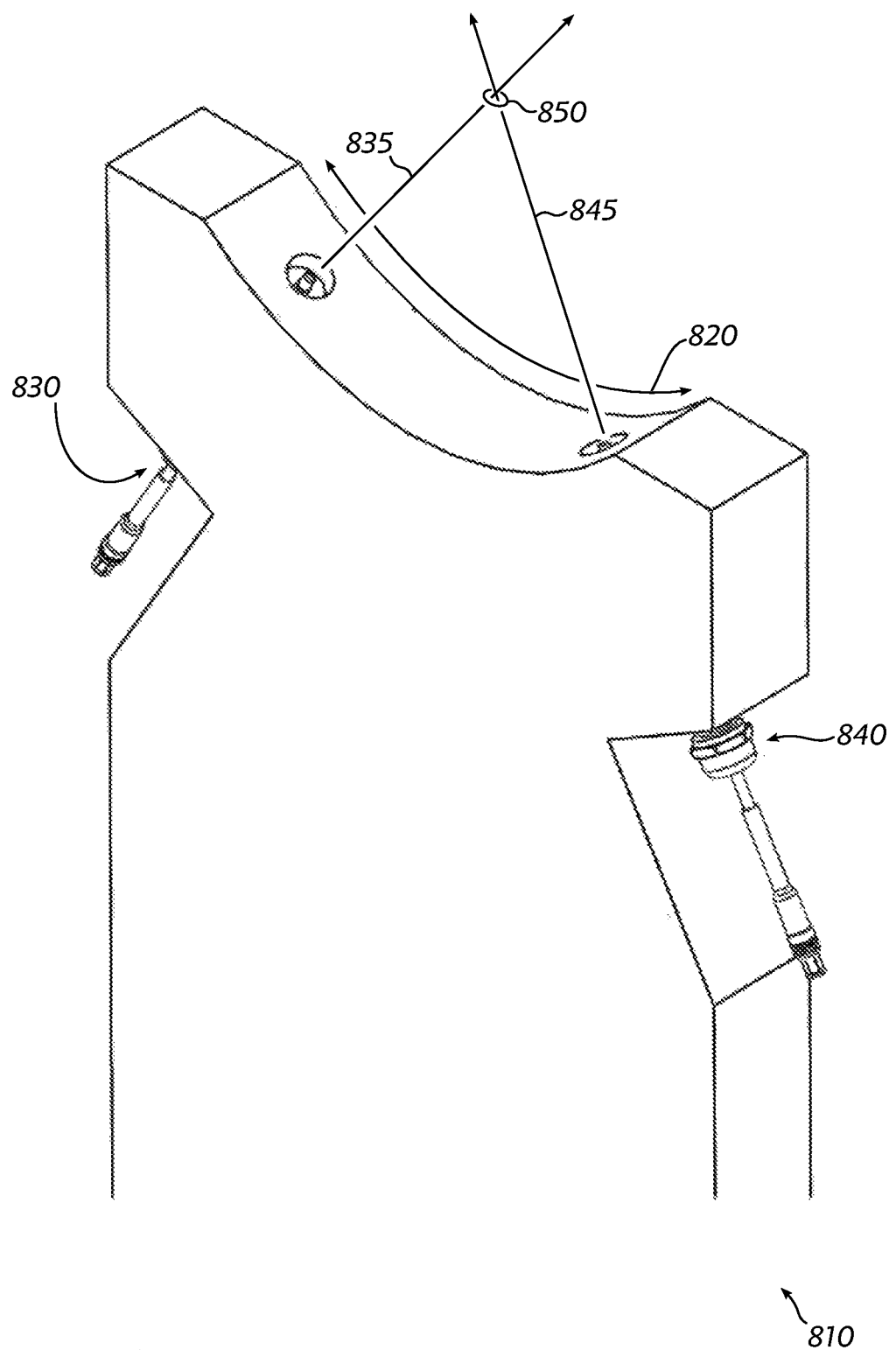
FIG. 8 shows a sensor suitable for use for the embodiment shown in FIG. 7.

FIG. 8 shows a sensor carrier 810. Its shape is mostly arbitrary (it can be shaped to suit possible mounting locations near the jackshaft). A curved surface 820 allows sensors 830 and 840 to be placed near the shaft. The sensors measure the distance to the shaft from different directions 835, 845, allowing the device to detect bending or flexing in different planes. (Recall that the different bending modes correlate with forces experienced by the blades and arbor while cutting a workpiece.) The sensors are preferably non-contact sensors such as eddy current or capacitive sensors. They report their measurements to the workpiece drive controller where jackshaft deflection is used to govern, in part, the workpiece feed speed. With this embodiment, a zero deflection will indicate that the saw is idling between workpieces. A small deflection indicates that the feed speed is too low; while a deflection that exceeds a predetermined value may indicate that the feed speed is too high. The workpiece drive controller adjusts the feed speed accordingly to maintain the deflection measurements within a predetermined range corresponding to the desired throughput, accuracy and deviation.

FIG. 9 is a block diagram showing more of the components that interact in an embodiment of the invention. A plurality of circular saw blades 930 are carried on an arbor driven by a jackshaft 920. A plurality of sensors 970 measure forces experienced by the arbor by one of the arrangements described above. These forces are reported to a motion control system 910, which adjusts the feed speed of a workpiece drive system 940. The drive system transports a workpiece 960 to and through the saw blades 930. Motion control system 910 may receive input from additional sensors, such as a video camera or computer-vision system 950, or an audio sensor (e.g., a microphone, 955) and use this data to further adjust the workpiece feed speed. The motion control system may be part of a more comprehensive process controller that also manages saw rotation speed or power, or other process parameters that affect throughput, accuracy or deviation.

Circular saw control systems according to an embodiment may be characterized by possessing a number of specific features. For example, an embodiment may comprise a plurality of sensors, each sensor to measure a sawing force near an end of a saw arbor carrying a plurality of saw blades, the sensors to measure forces in at least two different directions; a workpiece drive system to hold a workpiece through the plurality of saw blades at a feed speed; and a motion control system to receive measurements of the forces from the plurality of sensors and adjust the feed speed to improve process results.

Such an embodiment may be further characterized in that a first sensor of the plurality of sensors is positioned to measure a force correlated to a sawing radial force of a saw blade tooth traveling through the workpiece. Alternatively, it may be further characterized in that a second sensor of the plurality of sensors is positioned to measure a force correlated to a deviation friction radial force of a saw blade against a saw guide.

A circular-saw control system of an embodiment may be characterized in that the plurality of sensors are coupled near an end of the saw arbor so that the sensors can measure forces felt by the plurality of saw blades and communicated to the plurality of sensors by the saw arbor. One sensor of the plurality of sensors may be positioned near a non-driven end of the saw arbor, or one sensor of the plurality of sensors may be positioned near a driven end of the saw arbor.

A circular-saw control system of an embodiment may be characterized in that the sensor of the plurality of sensors is configured to substitute for a fixture coupling a saw arbor bearing to a frame of a circular saw.

Many circular-saw control systems according to an embodiment may be characterized in that the plurality of sensors are positioned outside an active sawing area.

A circular-saw control system of an embodiment may be characterized in that two sensors of the plurality of sensors measure displacements of the saw arbor in two different planes, said displacements caused by bending of the saw arbor during saw operation.

An embodiment may be used with a cantilevered saw arbor.

A circular-saw control system according to an embodiment may be further characterized in that it comprises a computer-vision system to observe a portion of a sawing operation, wherein the motion control system receives a signal from the computer vision system and adjusts the feed speed in part in accordance with the signal. Alternatively, a circular-saw control system according to an embodiment may be further characterized in that it comprises an audio sensor to measure a sound associated with a sawing operation, wherein the motion control system receives a signal from the audio sensor and adjusts the feed speed in part in accordance with the signal.

It is within the inventor's contemplation to perform a method of instrumenting a multi-blade circular saw to obtain a process-control signal, comprising identifying a sawing force vector corresponding to a radial force on a tooth of a saw blade traveling through a workpiece; identifying a deviation friction force vector corresponding to a radial force felt by the saw blade from friction against a saw guide; translating the sawing force vector and the deviation friction force vector through a saw arbor to determine a sawing reaction force vector and a deviation friction reaction force vector, each reaction force vector near an end of the saw arbor; identifying two locations and directions to measure the reaction force vectors outside an active sawing area; coupling a force sensor at each of the two identified locations to measure the reaction forces so that one force sensor produces a signal proportional in part to the sawing force vector, and another force sensor produces a signal proportional in part to the deviation friction force vector; and communicating the sensor signals to a workpiece feed control system.

Having performed the foregoing method, an embodiment may be further characterized in that one location of the two locations is near a fixture holding a saw arbor bearing to a frame of the multi-blade circular saw. On another hand, the method may be further characterized in that one location of the two locations is near an arbor of a multi-blade circular saw.

An embodiment of the invention may be a machine-readable medium, including without limitation a non-transient machine-readable medium, having stored thereon data and instructions to cause a programmable processor, such as a microcontroller or CPU of a programmable logic controller ("PLC"), to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a non-transient machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that circular saw, gangsaw and cantilevered-saw process measurement and control can also be achieved by software and hardware that distribute the functions of embodiments of this invention differently than herein described. Such variations and implementations are understood to be captured according to the following claims.

I claim:

1. A circular-saw control system comprising:
    a plurality of sensors, each sensor to measure a sawing force near an end of a saw arbor carrying a plurality of saw blades, the sensors to measure forces in at least two different directions;
    a workpiece drive system to hold a workpiece through the plurality of saw blades at a feed speed; and
    a motion control system to receive measurements of the forces from the plurality of sensors and adjust the feed speed to improve process results.

2. The circular-saw control system of claim 1 wherein a first sensor of the plurality of sensors is positioned to measure a force correlated to a sawing radial force of a saw blade tooth traveling through the workpiece.

3. The circular-saw control system of claim 1 wherein a second sensor of the plurality of sensors is positioned to measure a force correlated to a deviation friction radial force of a saw blade against a saw guide.

4. The circular-saw control system of claim 1 wherein the plurality of sensors are coupled near an end of the saw arbor so that the sensors can measure forces felt by the plurality of saw blades and communicated to the plurality of sensors by the saw arbor.

5. The circular-saw control system of claim 4 wherein the one sensor of the plurality of sensors is configured to substitute for a fixture coupling a saw arbor bearing to a frame of a circular saw.

6. The circular-saw control system of claim 1 wherein one sensor of the plurality of sensors is positioned near a non-driven end of the saw arbor.

7. The circular-saw control system of claim 1 wherein one sensor of the plurality of sensors is positioned near a driven end of the saw arbor.

8. The circular-saw control system of claim 1 wherein the plurality of sensors are positioned outside an active sawing area.

9. The circular-saw control system of claim 8 wherein the saw arbor is a cantilevered saw arbor.

10. The circular-saw control system of claim 1 wherein two sensors of the plurality of sensors measure displacements of the saw arbor in two different planes, said displacements caused by bending of the saw arbor during saw operation.

11. The circular-saw control system of claim 1, further comprising:
    a computer-vision system to observe a portion of a sawing operation, wherein
    the motion control system receives a signal from the computer vision system and adjusts the feed speed in part in accordance with the signal.

12. The circular-saw control system of claim 1, further comprising:
    an audio sensor to measure a sound associated with a sawing operation, wherein
    the motion control system receives a signal from the audio sensor and adjusts the feed speed in part in accordance with the signal.

13. A method of instrumenting a multi-blade circular saw to obtain a process-control signal, comprising:
    identifying a sawing force vector corresponding to a radial force on a tooth of a saw blade traveling through a workpiece;
    identifying a deviation friction force vector corresponding to a radial force felt by the saw blade from friction against a saw guide;
    translating the sawing force vector and the deviation friction force vector through a saw arbor to determine a sawing reaction force vector and a deviation friction reaction force vector, each reaction force vector near an end of the saw arbor;
    identifying two locations and directions to measure the reaction force vectors outside an active sawing area;
    coupling a force sensor at each of the two identified locations to measure the reaction forces so that one force sensor produces a signal proportional in part to the sawing force vector, and another force sensor produces a signal proportional in part to the deviation friction force vector; and
    communicating the sensor signals to a workpiece feed control system.

14. The method of claim 13 wherein one location of the two locations is near a fixture holding a saw arbor bearing to a frame of the multi-blade circular saw.

15. The method of claim 13 wherein one location of the two locations is near an arbor of a multi-blade circular saw.

* * * * *